United States Patent [19]

Oldham

[11] 4,427,262
[45] Jan. 24, 1984

[54] ARMOR WIRE SPLICES

[75] Inventor: Ronald C. Oldham, Chandless Ford, England

[73] Assignee: International Standard Electric Corporation, New York, N.Y.

[21] Appl. No.: 270,326

[22] Filed: Jun. 4, 1981

[30] Foreign Application Priority Data

Jul. 8, 1980 [GB] United Kingdom ............... 8022365

[51] Int. Cl.³ .................... G02B 7/26; H02G 3/06
[52] U.S. Cl. ............................ 350/96.23; 174/89
[58] Field of Search .................. 350/96.20, 96.23; 174/70 R, 89, 93

[56] References Cited

U.S. PATENT DOCUMENTS

| | | | |
|---|---|---|---|
| 1,866,235 | 7/1932 | Thiel | 174/89 |
| 2,884,477 | 4/1959 | Trickle, Jr. | 174/89 |
| 3,692,922 | 9/1972 | Sugimoto et al. | 174/93 |
| 4,239,336 | 12/1980 | Parfree et al. | 350/96.23 |
| 4,252,405 | 2/1981 | Oldham | 350/96.23 |
| 4,319,802 | 3/1982 | Bowes | 350/96.23 |

Primary Examiner—John D. Lee
Assistant Examiner—Frank González
Attorney, Agent, or Firm—John T. O'Halloran; Mary C. Werner

[57] ABSTRACT

Two cable ends have their cores jointed in a conventional manner. The ends of armor wires, laid up on the cores, are laid with overlap over the core joint. A sleeve with radiused and increased external diameter ends is arranged over the overlap at the core joint. The ends of the armor wires are turned back over the ends of the sleeve such that they come to rest on the outermost surface of the sleeve and are secured thereto by strappings. The outer surface of the sleeve may be coated with an adhesive and gritted to increase the adhesion between the armor wires and the sleeve. The thus spliced armor wires may be provided with a protective winding. The armor splice is such that only a low elongation of the armor wires is possible when longitudinal force is applied to the cable, thus making it particularly suitable for an armored submarine cable including optical fibres.

17 Claims, 1 Drawing Figure

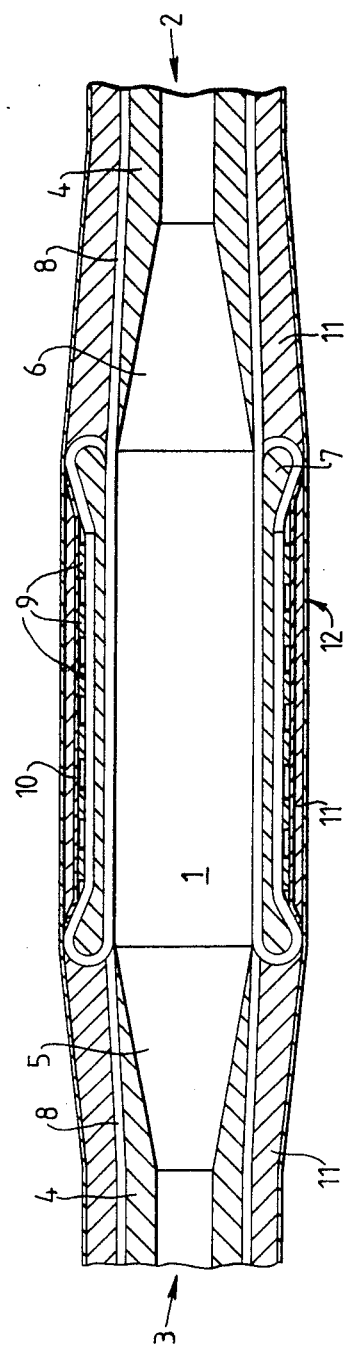

ARMOR WIRE SPLICES

BACKGROUND OF THE INVENTION

This invention relates to armor wire splices and in particular, but not exclusively, to methods of making armor wire splices for armored submarine cable containing optical fibres.

An armored submarine cable containing optical fibres may comprise a central strength member about which a plurality of optical fibres is arranged to form a fibre package. The fibre package is arranged within a protective aluminum pressure-resistant tube, and the tube is surrounded by a further strength member comprised, for example, of one or more layers of high tensile steel wires. A tubular copper conductor, for the supply of electrical power to a regenerator, is arranged over the further strength member, and a sheath of plastics insulating material, for example, polyethylene, is extruded over the copper conductor. One or more layers of armor wires, for example galvanized steel wires, are laid up directly or indirectly over the insulating sheath.

When such a cable is damaged in use, for example, or at other times when two armored cable ends have to be jointed, jointing must be carried out in such a manner as to reduce the risk of movement of the optical fibres within the jointed cable, in orrder to prevent strain on the optical fibre splices (joints). A conventional optical fibre cable joint (unarmored) and method of making it is disclosed in U.S. Pat. No. 4,252,405 and can be used to join the optical fibres and further strength member wires of armored cables.

These jointing methods employ ferrule elements with clamping arrangements to secure the further strength member steel wires and a chamber to accommodate optical fibres spliced in a conventional manner. The various ferrule elements are of electrically conductive material to provide electrical continuity between the copper conductor ends, and also effectively reinstate the pressure resistant tube over the fibre splices. A tube of plastic insulation material is arranged over the ferrule and injection moldings between each end thereof and the adjacent plastics sheath ends reinstate the insulant.

In the case of armored cable, the armoring wires must also be spliced or joined in some manner to also reinstate the armoring. A conventional technique known as overlay splicing, which is used in connection with submarine cables having metallic conductors instead of optical fibres, is not suitable for use with optical fibre cables since an armor joint so produced has a large possible elongation which may result in damage to the optical fibres, or the further strength member high tensile steel strands.

SUMMARY OF THE INVENTION

According to one aspect of the present invention there is provided a method of jointing two elongate members each including a core, with one or more elements therein, and a layer of armor wires laid up on the core, including the steps of jointing the two cores to provide continuity between the or each corresponding element thereof, laying the ends of the armor wires over the core joint such that they overlap a predetermined amount, positioning a sleeve over a central portion of the overlap, each end of the sleeve being of a larger external diameter than the remainder thereof, turning back the armor wire ends over the respective sleeve ends such that they come to lie on the outermost surface of the sleeve and securing them thereto.

According to another aspect of the present invention there is provided a sleeve for use in jointing armor wire ends of two elongate members, each including a core with one or more layers of armor wires laid up thereon, which sleeve includes a substantially cylindrical central portion of an internal diameter adapted to be a slide fit over the armor wire ends when laid up with overlap on the jointed cores, each end of the sleeve having an increased external diameter relative to the remainder thereof.

Yet another aspect of the invention comprises a joint for elongate members of the type described. The joint comprises the armor wires laid up to form an overlap portion over the jointed cores and the aforementioned sleeve disposed over the overlap portion. In the joint the armor wire ends are turned back over the respective sleeve ends such that they come to lie on the outermost surface of the sleeve and are secured thereto.

BRIEF DESCRIPTION OF THE DRAWING

The drawing shows a section through an armor wire splice made by a method according to the present invention.

DETAILED DESCRIPTION OF THE INVENTION

In the drawing reference numeral 1 designates a conventional polyethylene covered ferrule which has been used to joint two submarine cable ends 2, 3 that each contain optical fibres, as described hereinbefore. To the extent it is necessary, the disclosure of U.S. Pat. No. 4,252,405 is incorporated herein by reference to the same effect as if it were set out in full. In order that the outer diameter presented by one cable is suitable for armoring with laid up steel wires in a conventional manner, it may be built up to the required diameter by winding duck tape 4 thereon. After provision of the polyethylene over the ferrule, the duck tape is reinstated over the tapered moldings 5, 6 etc. Prior to the jointing of the cable ends 2 and 3 a barrel or sleeve 7 was slipped over the armoring on one of them. Once the armor wires 8, only one layer of which is indicated in the drawing, are relaid with overlap over the polyethylene covered ferrule 1, the barrel 7 is pulled up into position as shown. The ends of the armor wires 8 are trimmed to such a length that when turned back over the adjacent end of the barrel and laid over the outer surface of the barrel they do not extend as far as the opposite end of the barrel. The outer surface of the barrel is coated with an adhesive and gritted in order to increase the adhesion between the armor wires 8 and the barrel 7. Preferably the armor wires are cleared back to expose bare metal where they are to be turned back over the barrel. Once relaid over the outer surface of the barrel 7 the armor wire ends are secured to the barrel by means of stainless steel strappings 9. Bitumastic paint may be applied to the bare metal armor wires to reinstate the corrosion protection.

Polyvinyl chloride or other adhesive tape 10 is then wound round to form a layer thereof over the barrel 7 and the strappings 9 between the ends of the barrel 7. Subsequently the conventional polypropylene yarn protective winding provided over the armor wires along the lengths of the cables which have been joined is reinstated between the cable ends over the relaid armor wires 8 by winding polypropylene yarn 11 to extend from one cable end to the other and over the tape covered barrel 7. Finally polyvinylchloride or other adhesive tape 12 is wound to form a layer thereof over the reinstated polypropylene.

The barrel 7, which may be machined from high strength steel (e.g. EN16T or similar as defined in B.S. 970), has an increased diameter portion at each end which is radiused internally and externally in order to prevent damage to the armor wires turned back thereover. The ends are also tapered externally towards the center of the length of the barrel both to provide room for the strappings 9 and to enable polypropylene yarn to be wound over them for protective purposes, and also to prevent sideways movement of the strappings 9 towards and over the ends when strain is applied to the armor wires.

Thus the armor wires of the two cable ends are effectively interlinked by the barrel and the strappings. Tests have shown that such an armor splice results in armor wire elongation of less than 0.25% for axial loads of 10 tons, which is particularly suitable for use with cables incorporating optical fibres. Such a cable splice may, alternatively, be applied to joints between armor wires for other types of armored cables, such as conventional armored submarine cable with electrical conductors for electrical power or telecommunication purposes. The armor splice of the present invention is easy to apply, which is particularly advantageous for such splices frequently have to be made on a small repair ship. The shape and size of the ends of the barrel serves to reduce local strain in the armor wires when tensile load comes onto the joint, while the use of adhesive and grit serves to increase the coefficient of friction between the armor wires and the barrel to minimize slip and keep elongation to a minimum.

In the case of jointing cable with two layers of armoring, the outer layer may be removed for a distance either side of the splice and only the inner layer of wires jointed by means of a barrel splice as described above. Additional serving comprising wound polypropylene yarn may be provided on either side of the barrel up to where the outer armor layer begins to compensate for the removed outer armor wires.

The invention has been described by reference to a specific embodiment. Those skilled in the art will recognize that modifications other than those specifically mentioned can be made without departing from the spirit of the invention and the scope of the present invention is defined solely by the appended claims.

I claim:

1. A joint for two elongate members, each including a core and at least one layer of armor wires laid up on the core, said joint comprising
   first portions of said armor wires which extend beyond the respective core and onto the respective other core to overlap with the armor wires of the respective other elongate member,
   a sleeve positioned on said wires at said region of overlap; and
   second portions of said armor wires constituting continuations of said first portions and turned back around the respective ends of said sleeve.

2. The joint as claimed in claim 1 wherein said second portions of said armor wires are secured to the outer surface of said sleeve.

3. The joint as claimed in claim 1 wherein said sleeve has a substantially cylindrical central portion with such an internal diameter as to be a slide fit over the overlapped first portions of said armor wires, each end of said sleeve having an increased external diameter relative to the remainder thereof.

4. The joint as claimed in claim 3, wherein each sleeve end is internally and externally radiused to facilitate turning back of the armor wires thereon, and tapers externally for at least a predetermined distance in a direction towards the center of the length of the sleeve.

5. The joint as claimed in claim 1 wherein the cores comprise submarine optical fibres, a pressure resistant tube surrounding the optical fibres, tensile strength members surrounding the tube, a metallic tube surrounding the strength members and plastics insulating material surrounding the metallic tube, and wherein the cores are jointed by means including a ferrule adapted to surround spliced optical fibres, grip the tensile strength members and provide continuity between the ends of the pressure resistant tube and the metallic tube.

6. The joint as claimed in claim 1 for elongate members, each including a plurality of layers of armor wire laid up in the core, wherein only the armor wires of the innermost layer are secured to said sleeve, the outermost layer or layers having been removed for a predetermined distance on either side of said sleeve.

7. The joint claimed in claim 1 further comprising strapping bands securing said armor wire ends to the outermost surface of said sleeve.

8. The joint as claimed in claim 7, wherein the outermost surface of said sleeve is coated with an adhesive and gritted whereby the adhesion is increased between the armor wire ends and said sleeve.

9. A method of jointing two elongate members each including a core, with one or more elements therein, and a layer of armor wires laid up on the core, including the steps of jointing the two cores to provide continuity between the or each corresponding element thereof, laying the ends of the armor wires over the core joint such that they overlap by a predetermined amount, positioning a sleeve over a central portion of the overlap, each end of the sleeve being of a larger external diameter than the remainder thereof, turning back the armor wire ends over the respective sleeve ends such that they come to lie on the outermost surface of the sleeve and securing them thereto.

10. A method as claimed in claim 9 wherein the cores comprise submarine cable comprising optical fibres, a pressure resistant tube surrounding the optical fibres, tensile strength members surrounding the tube, a metallic tube surrounding the strength members and plastics insulating material surrounding the metallic tube, and wherein the cores are jointed by means including a ferrule adapted to surround spliced optical fibres, grip the tensile strength members and provide continuity between the ends of the pressure-resistant tube and the metallic tube.

11. A method as claimed in claim 9 for use when two or more layers of armor wires are laid up on the core, wherein only the armor wires of the innermost layer are secured to the sleeve, the outermost layer or layers of armor wires being removed for a predetermined distance on either side of the sleeve.

12. A method as claimed in claim 9, wherein each end of the sleeve is internally and externally radiused to facilitate turning back of the armor wires and tapers externally for at least a predetermined distance in a direction towards the center of the length of the sleeve.

13. A method as claimed in claim 9, wherein the armor wire ends are secured to the outermost surface of the sleeve by one or more strapping bands.

14. A method as claimed in claim 13, wherein the outermost surface of the sleeve is coated with an adhesive and gritted whereby the adhesion is increased between the armor wire ends and the sleeve.

15. A method as claimed in claim 9 including the step of winding a plastics protective tape in a layer on the sleeve and over the secured armor wire ends.

16. A method as claimed in claim 15 and wherein the cable ends each have a winding of protective yarn arranged over the armor wires, including the step of winding further protective yarn over the armor wires between the cable ends.

17. A method as claimed in claim 16 further including the step of winding a plastics protective tape in a layer over the further protective yarn.

* * * * *